United States Patent
Schumacher (10) Patent No.: US 8,544,297 B2
(45) Date of Patent: Oct. 1, 2013

(54) APPARATUS AND PROCESS TO ENHANCE THE UNIFORM FORMATION OF HOLLOW GLASS MICROSPHERES

(75) Inventor: Ray F. Schumacher, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 311 days.

(21) Appl. No.: 12/312,974

(22) PCT Filed: Dec. 4, 2006

(86) PCT No.: PCT/US2006/046167
§ 371 (c)(1),
(2), (4) Date: Jun. 2, 2009

(87) PCT Pub. No.: WO2008/069777
PCT Pub. Date: Jun. 12, 2008

(65) Prior Publication Data
US 2010/0064726 A1    Mar. 18, 2010

(51) Int. Cl.
*C03B 19/10*    (2006.01)
(52) U.S. Cl.
USPC .............................. 65/21.4; 65/21.1; 65/142

(58) Field of Classification Search
USPC .............. 65/21.1, 21.4, 142, 21.2, 21.3, 21.5, 65/141, 20, 22
See application file for complete search history.

(56) References Cited

U.S. PATENT DOCUMENTS

| | | | | |
|---|---|---|---|---|
| 4,303,433 A | * | 12/1981 | Torobin | 65/21.4 |
| 4,553,917 A | * | 11/1985 | Lee | 425/6 |
| 4,661,137 A | * | 4/1987 | Garnier et al. | 65/21.4 |
| 4,917,599 A | * | 4/1990 | Hasselmann | 431/328 |
| 5,256,180 A | * | 10/1993 | Garnier et al. | 65/142 |

FOREIGN PATENT DOCUMENTS

EP    1661865 A1 *    5/2006

* cited by examiner

*Primary Examiner* — Richard Crispino
*Assistant Examiner* — Yana Belyaev
(74) *Attorney, Agent, or Firm* — J. Bennett Mullinax, LLC (57) ABSTRACT

A process and apparatus is provided for enhancing the formation of a uniform population of hollow glass microspheres. A burner head is used which directs incoming glass particles away from the cooler perimeter of the flame cone of the gas burner and distributes the glass particles in a uniform manner throughout the more evenly heated portions of the flame zone. As a result, as the glass particles are softened and expand by a released nucleating gas so as to form a hollow glass microsphere, the resulting hollow glass microspheres have a more uniform size and property distribution as a result of experiencing a more homogenous heat treatment process.

8 Claims, 5 Drawing Sheets

APPARATUS AND PROCESS TO ENHANCE THE UNIFORM FORMATION OF HOLLOW GLASS MICROSPHERES

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

This invention is directed towards hollow glass microspheres and an apparatus and process for forming a high yield, uniform population of hollow glass microspheres. The hollow glass microspheres can be made of a mixture of porous and non-porous glass. Following the formation of the hollow glass microspheres (HGMs) and an appropriate heat treatment, components of the resulting glass microsphere can be leached yielding a population of porous-wall hollow glass microspheres (PWHGMs) intermixed with HGMs. The population of PWHGMs can subsequently be separated from the HGMs.

BACKGROUND OF THE INVENTION

Hollow glass microspheres (HGMs) are well known in the art. Microspheres are widely used as fillers in the plastics industry and may be made as either solid or hollow microspheres. Hollow and solid microspheres are used in reflective paints, coatings, and are incorporated into molded plastic products to improve workability of a material or to provide improved finish or surface qualities of a material such as an extruded plastic product.

The formation of hollow glass microspheres (HGMs) is well known in the art. The production of hollow glass microspheres has been described in U.S. Pat. Nos. 3,365,315 (Beck); 4,661,137 (Garnier); 5,256,180 (Garnier); and 5,534,348 (Miller et al) and which are incorporated herein by reference. Further, it is known that certain latent blowing agents may be included in a fine glass powder, such blowing agents including sulfates such as alkali sulfate along with various hydrates, carbonates, and halides. The selection and use of such blowing agents are well known in the art. The latent blowing agents cause a single bubble to nucleate within each particle of glass exposed to high temperatures such as in a flame.

It is also known in the art to produce large macrospheres having hollow glass walls which provide a semipermeable liquid separation medium for containing absorbents. The production of macrosphere structures can be seen in reference to U.S. Pat. Nos. 5,397,759 and 5,225,123 to Torobin and which are incorporated herein by reference. The Torobin references disclose hollow glass macrospheres comprising multiple particle glass walls. The reference teaches the use of the macrospheres for gas/liquid separation and for use with absorbents but does not discuss any features or characteristics which would make the microspheres suitable as a hydrogen storage medium.

U.S. Pat. No. 4,842,620 (PPG Industries) is directed to non-crystalline silica fibers having porous walls which are used in gas separation. The fibers described in this application have different physical characteristics than microspheres and which makes fibers less desirable with respect to hydrogen separation and storage capabilities.

U.S. Pat. No. 6,358,532 (CaP Biotechnology, Inc.) uses porous-wall hollow glass microspheres for cell clustering and biomedical uses. The porous-wall structures are designed to readily release microsphere contents when present within a biotic system. Alternatively, the microspheres are used to provide a substrate to support cell growth within the porous-wall structure.

While the above references disclose a variety of glass microspheres and porous-wall structures, there remains room for improvement and variation within the art for providing an improved process and apparatus for forming a high yield of a homogenous population of HGMs.

SUMMARY OF THE INVENTION

It is at least one aspect of at least one embodiment of the present invention to provide for a hollow glass microsphere (HGM) having a diameter range of between about 1.0 micron to about 140 microns, a density of about 0.05 gm/cc to about 0.50 gm/cc, and having a porous-wall structure having wall openings with an average pore size of between about 10 angstroms to about 1000 angstroms.

It is another aspect of at least one embodiment of the present invention to provide for a burner head which may be used to generate HGMs from glass particles containing blowing agents by use of a burner having a configuration which stabilizes the flame combustion zone, improves the temperature distribution of the combustion zone, and has an internal configuration to feed glass particles into the burner having a distribution pattern which enhances the formation of a high percentage yield of uniform HGMs.

It is yet another aspect of at least one embodiment of the present invention to provide for a process of making hollow glass microspheres comprising: supplying a plurality of granular glass particles having an average particle size of between about 1 micron to about 80 microns; introducing the plurality of glass particles into a fuel feed stream of a gas/oxidizer burner, the plurality of glass particles being present at a ratio of about 1 gram of glass feed particles per about 3 standard cubic feet per minute of gas/air fuel mixture; passing the gas/air fuel stream and the introduced glass particles into the gas burner, the burner further comprising a burner head having a plurality of conduits positioned within the glass flow pathway wherein the fuel feed stream and the glass particles pass through the conduits and exit into a flame zone of the gas burner; forming hollow glass microspheres from the glass particles as the glass particles release a latent blowing agent, the blowing agent expanding the glass particles into hollow glass microspheres as the glass particles pass through the flame zone of the burner; and, quenching the hollow glass microspheres within a cooling fluid as the hollow glass microspheres exit the flame zone of the gas burner.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawing.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

The hollow glass microspheres of the present invention are prepared using a special glass composition which after appropriate heat treatment separates into two continuous glass phases. In the examples provided herein, one of the phases is rich in silica, while the other is an extractable phase. The extractable phase is preferably present in an amount of at least about 30 weight percent of the total glass composition. However, other porous glass compositions may be used.

The extractable phase of the glass composition preferably includes boron-containing materials such as borosilicates or alkali-metal borosilicates. Suitable borosilicates and alkali-metal silicates may be found in reference to the teachings of U.S. Pat. No. 4,842,620 directed to leachable glass fiber compositions and which is incorporated herein by reference.

The extractable and non-extractable glass components are mixed, melted, quenched, and crushed to a fine glass powder consisting of individual glass particles having a particle size of about 5 to about 50 microns. In general, the more uniform the particle size distribution, the greater size uniformity of the resulting HGMs. The individual glass particles are then reheated using a gas/oxidizer flame. The glass is raised to a temperature where a latent blowing agent within the glass, such as alkali sulfate along with various hydrates, carbonates, and halides, the selection and use of which are well known in the art, causes a single bubble to nucleate within each particle of glass. As the glass particle temperature increases by exposure to the flame, the glass particle reaches a viscosity where the particle transforms to a sphere due to the surface tension forces. More specifically, as the temperature increases, the pressure within the bubble exceeds the surface tension/viscous forces value and the bubble diameter expands by about two times to form a hollow glass microsphere. The hollow glass microsphere is then rapidly quenched to room temperature by a quenching fluid such as a gas or liquid.

According to the present invention, it has been found that a more homogeneous and uniform population of hollow glass microspheres (HGMs) may be provided by using a specially constructed burner head in combination with a commercial gas burner torch. The burner head has a configuration which directs the incoming glass particles away from the outer, cooler circumference of the flame or heat zone. A plurality of axial passageways are provided within the flame head to help distribute the glass particles into a highly uniform distribution within the heated zone. By directing the glass particles into a hotter, more uniform portion of the formed heated zone, a more consistent population of HGMs is provided.

Figure 1:
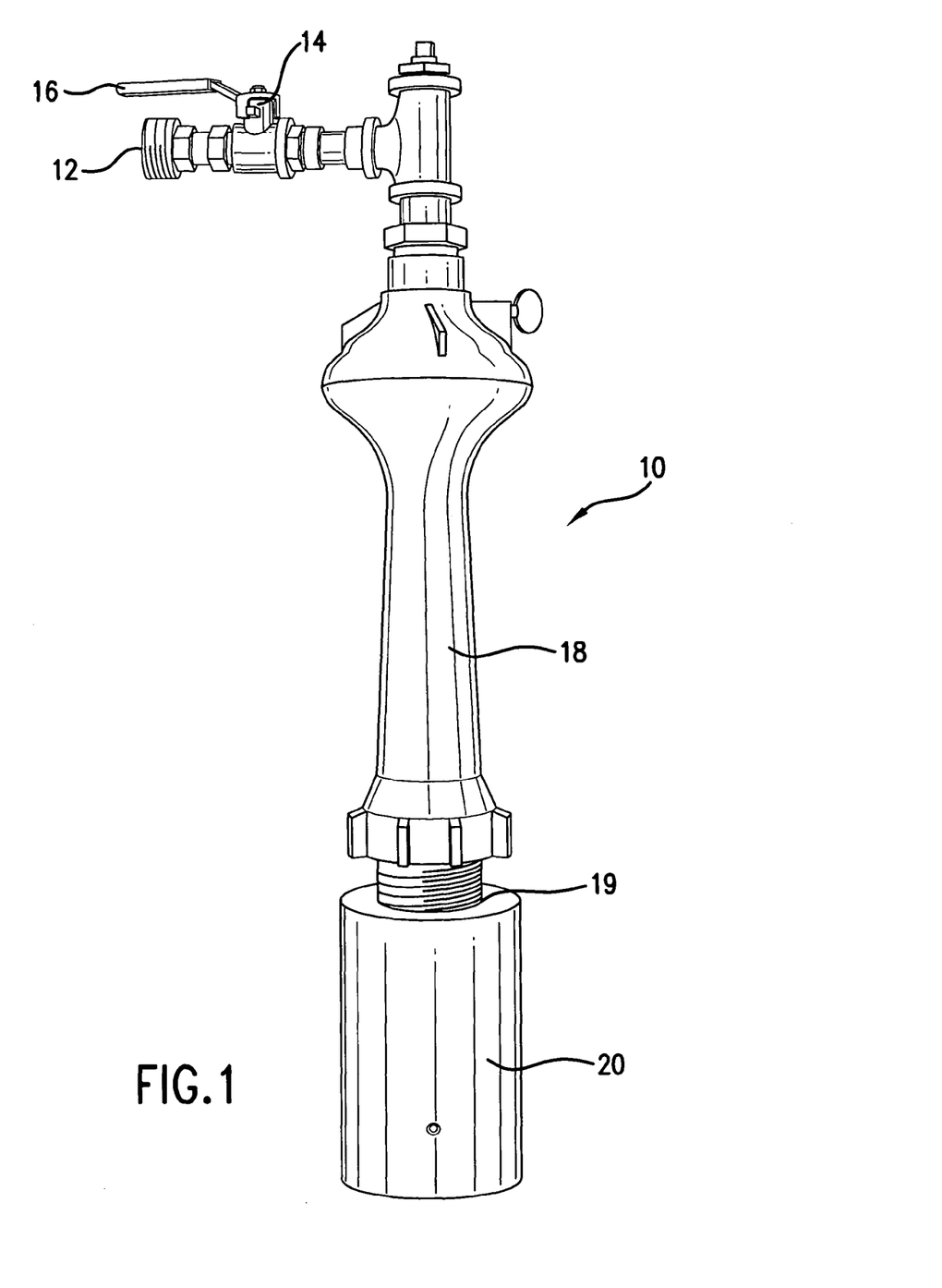
FIG. 1 is a perspective view of a burner and burner head used in the process of making HGMs.

The embodiment of a gas burner 10 is seen in reference to FIG. 1. Burner 10 has an inlet 12 for admitting a conventional gas stream comprising one or more natural gas elements such as propane, butane, methane, or various combinations thereof. An on/off valve 14 having a handle 16 is provided within the flow path of burner 10. A conventional needle valve (not shown) may be used to regulate the fuel gas flow. Burner 10 has a main body portion 18 having a terminal end portion 19 to which a burner head 20 is attached.

Figure 2:
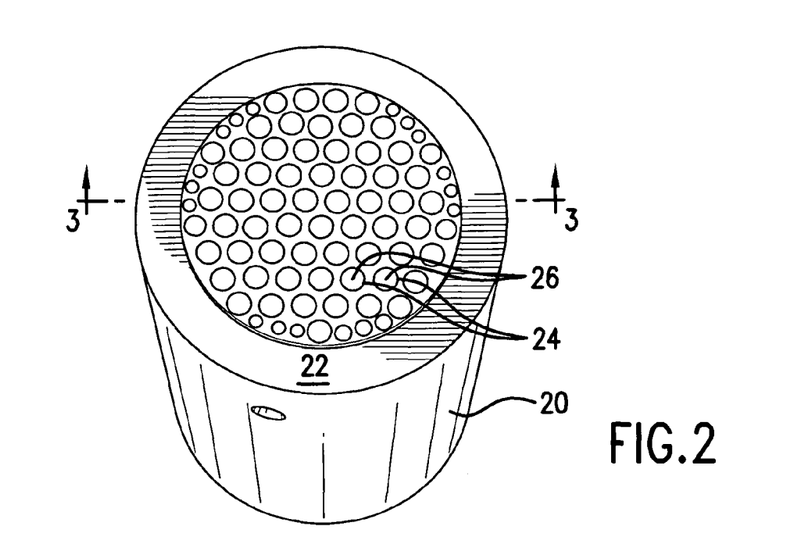
FIG. 2 is a perspective view of an embodiment of a burner head.

Burner head 20 has an interior passageway configuration which has been found to enhance the formation of a useful population of uniform HGMs. As seen in reference to FIG. 2, a free end 22 of burner head 20 comprises a plurality of openings 24, each opening 24 representing a terminal end of a respective conduit 26 and which, as seen in reference to FIG. 3, extends at least approximately two inches along the interior portion of the burner head 20.

Figure 3:
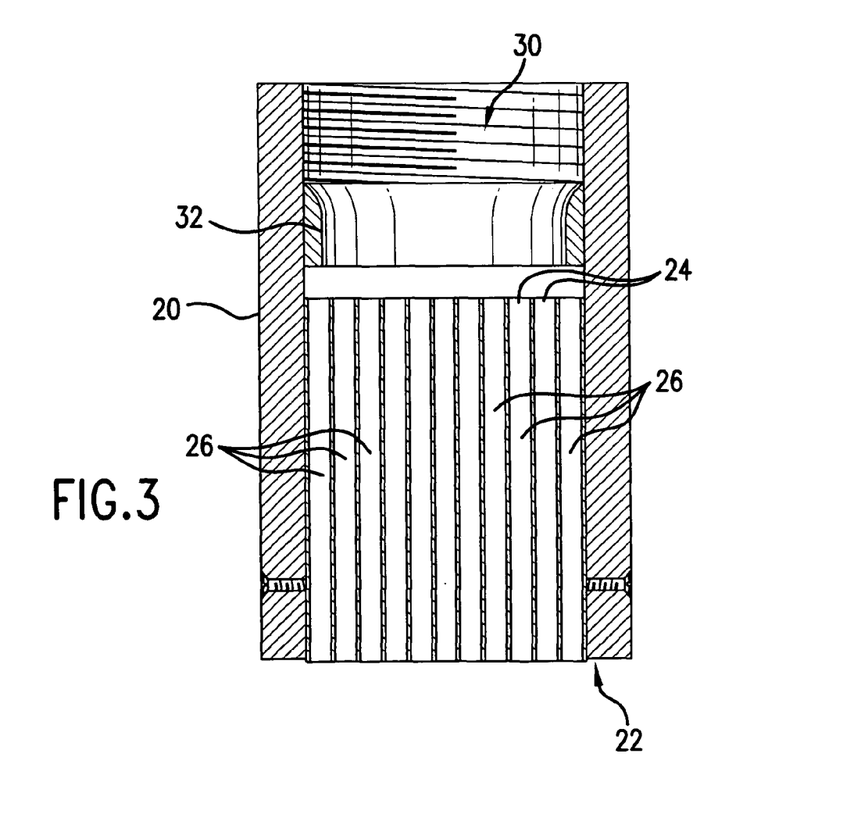
FIG. 3 is a sectional view similar to FIG. 1 showing internal details of the burner head seen in FIG. 1.

As best seen in reference to FIG. 3, an interior passage 30 of burner head 20 defines a reduced diameter region 32 which directs incoming gas and glass particles away from the walls of passage 30. The reduced diameter region 32 may be provided by an interior baffle, the integral constricted portion of the passage wall, insertable rings, or similar structure which provides a method of directing the gas/particle flow away from the interior passage walls 30. By so doing, the gas flow and particles are directed toward the more central portions of the plurality of conduits 26. As the combination of glass particles and burner gas are directed towards the intake portion of conduits 26, the particles and gas enter one of the respective conduits 26 and emerge from a corresponding opening 24 along the terminal end of burner head 20. The conduits 26 help equalize the velocity of both the gas and the glass particles and further help provide a more uniform distribution of the glass particles as they emerge from the respective opening 24. A receiving portion of each conduit 26 may be countersunk relative to the surrounding wall material in which conduits 26 are formed. The countersunk and/or tapered portions help to guide the glass particles into the channels and then into the respective plurality of flame cones. This arrangement helps reduce the build up of glass powder on the flame former head surrounding the intake portions of conduits 26.

The plurality of glass particles may be present at a ratio of about 1 gram of glass particles to about 3 standard cubic feet per minute of a gas/air fuel mixture. The gas/air fuel mixture flows through the expanding burner tube prior to entering the burner head. The burner head defines a plurality of conduits and exits into a plurality of flame cones (FIG. 4B) at a terminal end of the burner head. The burner head provides a uniform series of flame cones which combine to form a higher temperature heated flame zone the interior of which is uniform in temperature.

While the conduits 26 and openings 24 are illustrated as substantially circular in shape, it is believed that a variety of other cross sectional shapes may be used to form the conduits 26. For instance, a variety of polygonal shaped conduits may be used providing a "honeycombed" appearance to the conduits 26 when seen in cross section. The conduits 26 also help prevent a condition of "flash back" of the flame as the flame or combustion velocity nears the gas/air flow velocity. In addition, the fuel flow through the conduits 26 provides a cooling effect to the conduits to prevent excessive heat build up.

Opposite the terminal end of burner head 20, a lit torch will define a planer array of flame cones followed by a heated flame zone where HGM expansion takes place. As seen in reference to FIG. 4A, the glass particles exit the burner head and enter the flame cone having a solid viscosity. As the glass particles proceed through the flame, the glass particles experience a rapid temperature increase. As the temperature increases, the viscosity of the glass particles decreases from a solid to a less viscous state. During this temperature change region, the viscosity of the glass particles changes from a solid material to a more fluid, sphere-shaped material.

Figure 4A:
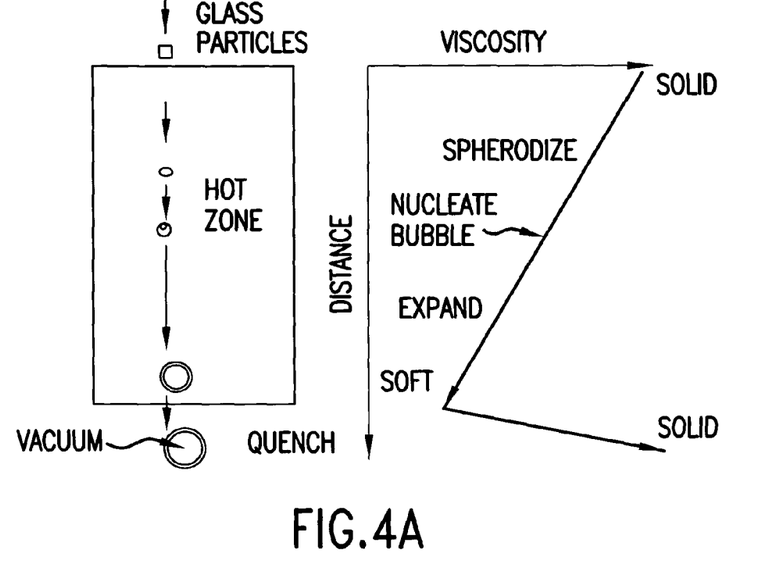
FIG. 4A and 4B are schematic diagrams illustrating changes to a glass particle as it passes through a flame cone and a heat zone associated with a burner head when configured to generate HGMs.
Figure 4B:
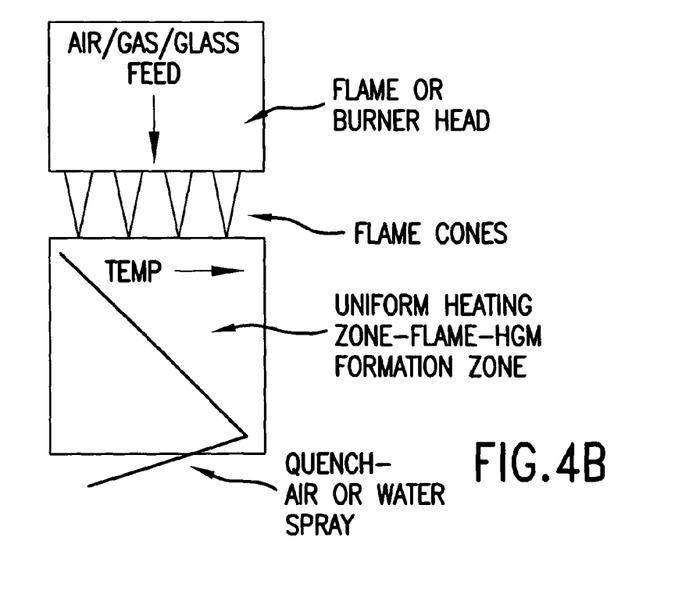

Gas formers within the glass particles form a nucleating gas bubble within an interior of the glass particle. The gas former expands the glass particle diameter by a factor of about two times as the glass passes through the heated zone and the latent gas expands the HGM to its final state. As the pressure from the nucleating gas bubble increases, the gas pressure forces the glass particle to expand, forming an interior cavity within the glass particle. The resulting structure, a HGM, exits the heated flame zone and is rapidly quenched by cooled air or a water spray.

The heated flame zone and quenching mechanism may be contained in a large tank where the formed HGMs can either be removed with the dry air stream or with the quench water spray. The quench rate of the HGMs is believed to be in the range of millions of degrees Kelvin per second. It is also believed that the distance of the quench zone from the burner head is one variable that may affect the size and density of the HGMs. In addition, the ambient pressure associated with the forming steps of the HGMs is another variable that will influence the speed of particle formation and the diameter of the resulting HGMs. The rapid quenching is believed to further contribute to the formation of a uniform population of HGMs having similar size and other physical properties.

Figure 6:
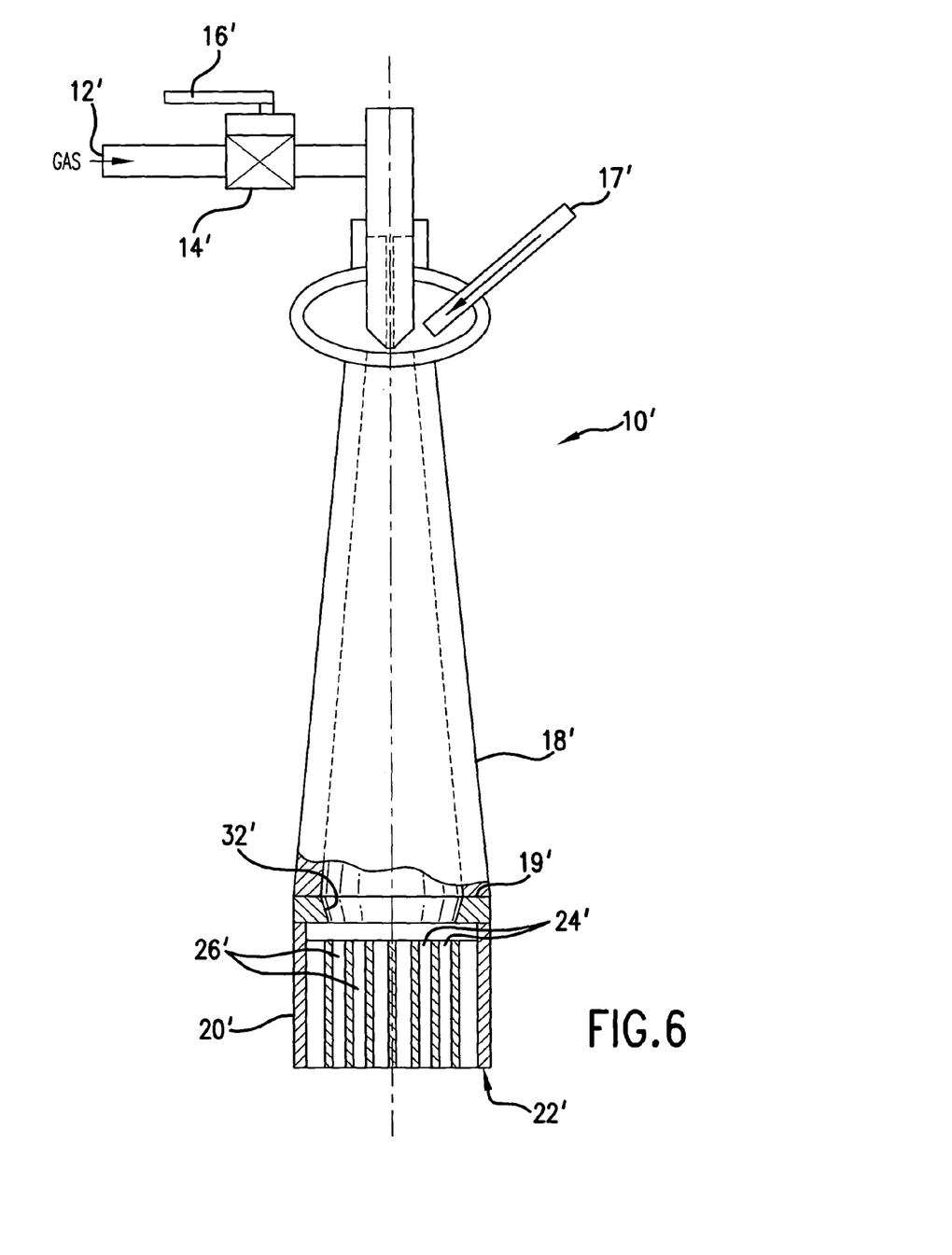
FIG. 6 is a alternative embodiment of a schematic design of a torch useful in forming HGMs.

As seen in reference to FIG. 6, an additional embodiment of a gas burner 10' is seen. Gas burner 10' has features designed expressly for use with formation of hollow glass microspheres. As seen in reference to FIG. 6, gas burner 10' may have a conventional inlet 12' along with an on/off valve 14' having a handle 16' used to control the on/off capabilities of the burner 10'. Burner 10' has a main body portion 18' and a terminal end portion 19' to which a burner head 20' is attached. As seen in reference to FIG. 6, main body portion 18' has an interior dimension having approximately 10° taper from a receiving end to a discharge end. Within the main body portion 18', a glass feed conduit 17' is positioned to allow for the pneumatic feed of glass particles which are incorporated into the combustion air stream.

As the combination of combustion air, glass particles, and fuel/gas pass through the interior of portion 18' of burner 10', a reduced diameter region 32' is provided in the form of an interior baffle, a constricted portion of the passage wall, an insertable ring, or a similar structure. The combination of the reduced diameter region with the gas, air, and particle flow directs the flow of gases and particles toward an axial center of the main body portion 18'. A burner head 20' having a free end 22' defines a terminal end of the burner 10'. As illustrated, a plurality of conduits 26' extends a distance of at least about 2 inches along an interior portion of the burner head 20'. As the particles and gases enter burner head 20', the materials are directed to one of a plurality of openings 24', the particles and gas exit the terminal end 22' of the burner head 20'. The conduits 26' help equalize the velocity of the fuel gas, combustion gas, and the glass particles to maintain a more uniform distribution of the glass particles as they emerge from the openings 24'. By this arrangement, the glass particles, when exiting the burner, will maintain a distribution and a position within the uniform heated zone opposite a distal end of the flame cone. In this manner, the glass particles are exposed to uniformly elevated temperatures and conditions which result in a more uniform population of formed hollow glass microspheres. The actual formation of the hollow glass microspheres is similar to the process described in reference to gas burner seen in reference to FIGS. 1 and 3.

Suitable burner torches according to the present invention can be made in a variety of sizes. It is envisioned that conventional torches can be scaled up having burner heads having diameters of one foot or more. In such a configuration, it may be useful to employ a static mixer and/or additional baffles so as to bring about a more thorough mixing of the glass particles within the fuel gas and air combustion gas streams.

Preferably, the resulting hollow glass microspheres have densities in the range of about 0.05 gm/cc to about 0.5 gm/cc and diameters may range between about 1 to about 140 microns. Once formed, the hollow glass microspheres may be separated on the basis of density using liquid or fluid separation so as to select and segregate the hollow glass microspheres according to desired densities. Additionally, it is possible to separate the HGMs according to the microsphere diameter.

The resulting hollow glass microspheres have a glass wall composition in which the glass is essentially homogeneous due to the high rate of quenching. The hollow glass microspheres may be heat treated to enhance the glass-in-glass phase separation by mixing the hollow glass microspheres with carbonaceous materials and heating in the absence of oxygen or heating the HGMs alone in air to the desired temperature. After heat treating the hollow glass microspheres, the homogeneous glass separates into two continuous glass phases: one extractable and the other rich in silica. The extractable phase is readily leachable using strong mineral acids which results in the formation of wall pores within the remaining silica-rich phase. Suitable mineral acids and methods for leaching the glass may be seen in reference to U.S. Pat. No. 4,842,620 which is incorporated herein by reference.

The resulting hollow glass microspheres exhibit a high degree of cell wall porosity. As used herein, the term "porosity" means a series of pores and similar openings which either directly or indirectly defines a series of passageways which provide communication between the interior and the exterior of the hollow glass microsphere. An average cell wall porosity of about 10 angstroms to about 1000 angstroms can be achieved using this technology. The cell wall porosity is dependent upon the percentage of extractable components formulated into the special glass composition used in the formation of the HGM and the degree of heat treatment employed. The duration and severity of the extraction process also can have some influence on the characteristics of the resulting cell wall pores including size and density of pores formed.

Figure 5:
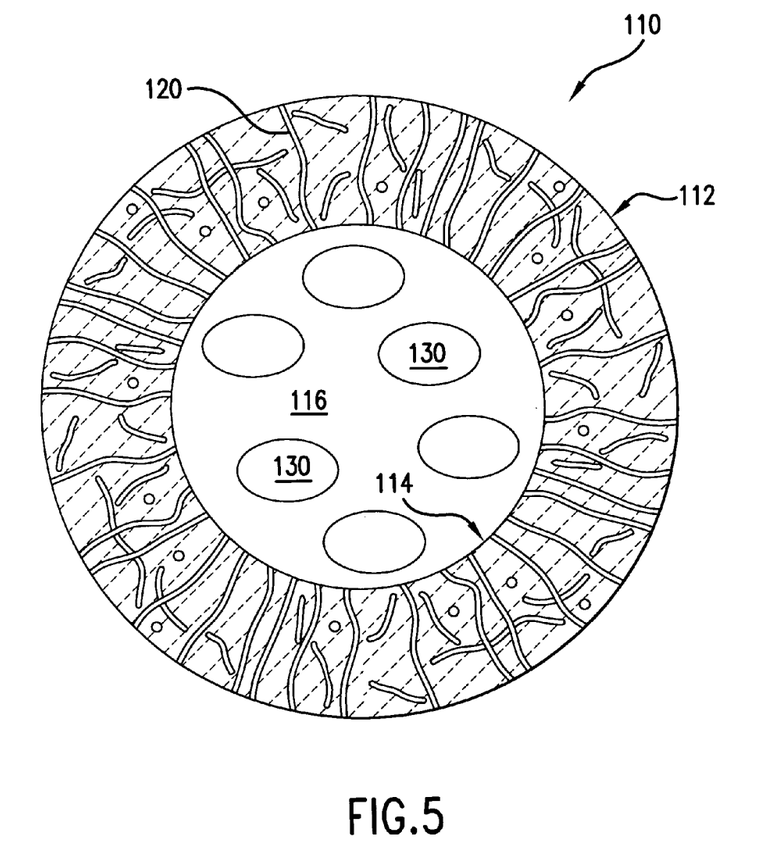
FIG. 5 is a cross section through a PWHGM.

As seen in reference to FIG. 5, a cross section through a porous wall hollow glass microsphere 110 is provided.

Microsphere 110 comprises a glass wall having an exterior surface 112 and an interior surface 114. The microsphere 110 further defines a hollow cavity 116 within the interior of the microsphere. As best seen in reference to the figure, a plurality of pores 120 are defined within the glass wall of the microsphere. As illustrated in FIG. 5, a number of the pores 120 provide for communication between an exterior of the hollow glass microsphere and the interior cavity 116 of the hollow glass microsphere.

Once formed, the porous-wall hollow glass microspheres can be filled with a hydrogen absorbent 130 such as palladium as described in the assigned co-pending application Ser. No. 10/946,464, filed on Sep. 21, 2004, and Ser. No. 11/256,442, filed on Oct. 21, 2005 both of which are incorporated herein by reference.

For certain applications, it is noted that by additional heating of the porous HGMs to a temperature of about 1000° C., the porosity can be removed and/or selectively reduced by controlling the temperature and treatment time intervals.

The resulting hollow glass microsphere containing a hydrogen absorbent offers numerous advantages for use with hydrogen absorbing technologies. For instance, when palladium metal and other metal hydrides are used in a hydrogen absorption/desorption process, the hydrogen storage material tends to fracture into smaller particles or "fines." The resulting fines can clog filters, limiting gas flow through the filtration bed in hydrogen separation devices, and/or blocking gas flow in hydrogen storage devices resulting in an overall loss of efficiency of the hydrogen absorption/desorption system. However, when encapsulated within the hollow glass microsphere, the resulting fines are contained within the hollow glass microsphere and continue to function in an absorption/desorption capacity.

Additionally, it is possible to prepare or select HGMs having a sufficiently small pore size such that gaseous poisons which may interfere with the hydrogen absorbing material are physically excluded from entry into the interior of the HGM. As a result, the HGM functions as a selective membrane which permits the flow of hydrogen gas into and out of the hollow glass microsphere while preventing the entry of larger gaseous or liquid molecules.

While it is possible to force hydrogen into and out of solid-walled microspheres, the use of a porous-wall hollow glass microsphere structure allows hydrogen gas to enter and exit the microsphere at much lower pressures and temperatures. Consequently, less strenuous rehydriding/dehydriding conditions can be employed using the porous-wall structure as a conduit to enable the passage of hydrogen gas through the wall of the glass microsphere.

Where the pore size of the resulting hollow glass microsphere is sufficiently large that gaseous poisons or other materials could enter, it is possible to provide barrier coatings to the exterior of the HGM. The various barrier coatings may be selected for special properties so as to provide for selective membrane properties. One such coating material is a sol gel material having a sufficiently defined pore structure that provides for a barrier against gaseous poisons while permitting the flow of hydrogen gas therethrough. One such sol gel material may be found in reference to the commonly assigned U.S. Pat. No 5,965,482, and which is incorporated herein by reference.

The hollow glass microspheres, containing therein a hydrogen storage material, offer additional advantages within the hydrogen storage technology field. The hollow glass microspheres used in accordance with the present invention may have diameters of between about 1 micron to about 140 microns. Given the size and selectable particle densities, the resulting hollow glass microspheres have fluid-like properties which make the hollow glass microspheres suitable for easier transport and bulk storage. For instance, transportation of large quantities of the filled hollow glass microspheres may be made utilizing existing pipelines used to convey the supplies of petroleum products and/or natural gas.

For use as a hydrogen storage media or for other industrial uses which are known for HGMs, it is desirable to be able to form and segregate similar sized hollow glass microspheres. The use of the above described process including the configured burner head has been found to provide enhanced yields of a uniform population of hollow glass microspheres. While one having ordinary skill in the art will recognize that it is possible to vary parameters such as glass composition, glass particle size, velocity through the flame zone, temperature ranges within the flame zone, and quenching conditions so as to vary the properties of the resulting HGMs, for any set of conditions, the process described above provides for a higher yield of a uniform population of HGMs. As such, a greater uniformity in size and properties of the HGMs are achieved.

While palladium represents one hydrogen storage material which may be incorporated into the interior of the hollow glass microspheres, it should be noted that a variety of other hydrogen storage materials are also suitable for use within the interior of a porous-wall hollow glass microsphere. Such materials include sodium aluminum hydride, lithium aluminum hydride, titanium aluminum hydride, complex hydrides, and various fused or hybrid hydrogen storage materials such as those described in commonly assigned PCT application PCT/US03/34980 which is incorporated herein by reference, and various catalyzed borohydrides as described in commonly owned U.S. application Ser. Nos. 11/130,750, filed on May 17, 2005 and 11/343,048, filed on Jan. 30, 2006, both of which are incorporated herein by reference, and combinations of these hydrogen storage materials. Additionally, the hollow glass microspheres can be utilized to provide a "protective environment" for reactive hydrides or other hydrogen storage materials which occupy the hollow interior of the porous hollow glass microsphere.

In addition, the use of the hollow glass microspheres greatly simplifies commercial recharging of the spent hydrogen storage material. For instance, where the hollow glass microspheres containing the hydrogen storage material are used to power a device, the spent HGM may be removed during a refueling operation and subsequently recharged. By allowing a separate recharging or hydrogen absorption process, the HGMs having a hydrogen storage material can be utilized in various environments such as a hydrogen-powered motor vehicle. To the extent the vehicle only needs to provide for a hydrogen release mechanism, the mechanics and operation of the vehicle may be greatly simplified. Upon refueling with a fresh supply of HGMs (containing hydrided hydrogen storage material) the spent HGMs are simply removed for subsequent rehydriding. It is believed that having a high degree of uniformity in sizes and properties of the HGMs greatly enhances the commercial applications of hollow glass microspheres whether used as a hydrogen storage material or for other industrial purposes.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of making hollow glass microspheres comprising:
   supplying a plurality of granular glass particles having an average particle size of between about 1 micron to about 80 microns;
   introducing said plurality of glass particles into a fuel feed stream of a glass burner, said plurality of glass particles being present at a ratio of about 1 gram per 3 standard cubic feet per minute to said fuel stream;
   passing said fuel feed stream and said introduced glass particles into said gas burner, said burner further defining an interior reduced diameter wall region and adjacent an intake region of a plurality of conduits positioned within the glass flow pathway;
   directing said fuel feed stream and said glass particles through said conduits and thereby equalizing a velocity of both the fuel feed stream and the glass particles as the particles and fuel feed stream are directed to a flame zone of said gas burner;
   forming hollow glass microspheres from said glass particles as said glass particles release a latent blowing agent, said blowing agent expanding said glass particles into hollow glass microspheres as said glass particles pass through the flame zone of said burner; and,
   quenching said hollow glass microspheres within a cooling fluid as said hollow glass microspheres exit said flame zone of said gas burner.

2. The process according to claim 1 wherein said reduced diameter region is positioned so as to direct glass particles away from the edge walls of said burner head.

3. The process according to claim 1 wherein said plurality of conduits extends a length of a burner head of the gas burner.

4. The process according to claim 1 wherein said step of quenching further comprises directing said hollow glass microspheres into a vessel.

5. The process according to claim 4 comprising an additional step of collecting the hollow glass microspheres by vacuum collection.

6. The process according to claim 4 wherein said quenching step further comprises collecting said hollow glass microspheres within the quenching fluid.

7. The process according to claim 1 wherein said plurality of conduits extends along an entire length of said burner head.

8. A process of making hollow glass microspheres comprising:
   supplying a plurality of granular glass particles having an average particle size of between about 1 micron to about 80 microns;
   introducing said plurality of glass particles into a fuel feed stream of a glass burner, said plurality of glass particles being present at a ratio of about 1 gram per 3 standard cubic feet per minute to said fuel stream;
   mixing the feed stream and the glass particles prior to delivery to a flame zone of the glass burner;
   passing said fuel feed stream and said introduced glass particles into said gas burner, said burner further defining an interior reduced diameter wall region and adjacent an intake region of a plurality of conduits extending axially along a length of said burner head and positioned within both the glass flow pathway and the fuel feed stream and thereby equalizing a velocity of both the fuel feed stream and the glass particles as the particles and fuel feed stream are directed to the flame zone of said gas burner;
   forming hollow glass microspheres from said glass particles as said glass particles release a latent blowing agent, said blowing agent expanding said glass particles into hollow glass microspheres as said glass particles pass through the flame zone of said burner; and,
   quenching said hollow glass microspheres within a cooling fluid as said hollow glass microspheres exit said flame zone of said gas burner.

* * * * *